United States Patent
Hamagami et al.

(10) Patent No.: US 11,521,393 B2
(45) Date of Patent: Dec. 6, 2022

(54) INFORMATION PROCESSING SYSTEM, PROGRAM, AND CONTROL METHOD

(71) Applicant: TOYOTA JIDOSHA KABUSHIKI KAISHA, Toyota (JP)

(72) Inventors: Kana Hamagami, Nissin (JP); Takuya Maekawa, Nissin (JP); Yosuke Nakayama, Owariasahi (JP); Akitoshi Jikumaru, Nissin (JP); Tae Sugimura, Miyoshi (JP); Takao Hishikawa, Nagoya (JP); Shinichi Adachi, Takahama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 459 days.

(21) Appl. No.: 16/782,149

(22) Filed: Feb. 5, 2020

(65) Prior Publication Data
US 2020/0272829 A1  Aug. 27, 2020

(30) Foreign Application Priority Data
Feb. 25, 2019 (JP) .............................. JP2019-032034

(51) Int. Cl.
*G06K 7/14* (2006.01)
*B60K 35/00* (2006.01)
(Continued)

(52) U.S. Cl.
CPC ............. *G06V 20/56* (2022.01); *B60K 35/00* (2013.01); *B60R 11/04* (2013.01); *G06K 7/1417* (2013.01);
(Continued)

(58) Field of Classification Search
CPC ..................................................... G06V 20/56
See application file for complete search history.

(56) References Cited

U.S. PATENT DOCUMENTS 9,972,230 B1 * 5/2018 DeLorean .............. G08G 1/052
10,836,254 B2 * 11/2020 Mimura ................. G06V 20/56
(Continued)

FOREIGN PATENT DOCUMENTS

| JP | 2008-257540 A | 10/2008 |
| JP | 2009-294757 A | 12/2009 |

(Continued)

OTHER PUBLICATIONS

U.S. Appl. No. 16/666,507, filed Oct. 29, 2019.

*Primary Examiner* — Irfan Habib
(74) *Attorney, Agent, or Firm* — Oblon, McClelland, Maier & Neustadt, L.L.P.

(57) ABSTRACT

A vehicle is configured to image, with an outside camera, an identification mark associated with a content provided by a service provider, output the content associated with the imaged identification mark to an occupant in a cabin of the vehicle, acquire operation information on the occupant relating to the output content, and acquire information regarding the occupant when the occupant performs operation relating to the content in the vehicle cabin. An information processing apparatus is configured to, when determining that the output content is not selected by the occupant based on the operation information on the occupant, determine whether or not to update the content that is not selected, based on the information regarding the occupant.

6 Claims, 10 Drawing Sheets

| IDENTIFICATION MARK | INFORMATION REGARDING OCCUPANT | FAVORABILITY RATING OF OCCUPANT | NECESSITY OF UPDATE | OCCUPANT ATTRIBUTE | CONTENT |
|---|---|---|---|---|---|
| S1 | EXPRESSION: SMILING FACE | 100 | UNNECESSARY | NUMBER OF PERSONS: THREE SEX: MALE, FEMALE, MALE AGE: 40 YEARS OLD, 35 YEARS OLD, 0 YEARS OLD | INFORMATION ON FACILITY IN COMMERCIAL FACILITY: BABY PRODUCTS STORE COUPON INFORMATION: DISCOUNT COUPONS FOR BABY PRODUCTS |
| S2 | GESTURES: HESITATING GESTURE | 10 | NECESSARY | FACE | PRODUCT DETAILS: PRODUCT MOST ORDERED IN PAST |
| : | : | : | : | : | : |

(51) Int. Cl.
  *B60R 11/04* (2006.01)
  *G06V 20/56* (2022.01)
  *G06V 20/59* (2022.01)
  *B60R 11/00* (2006.01)

(52) U.S. Cl.
  CPC ........... *G06K 7/1447* (2013.01); *G06V 20/59* (2022.01); *B60R 2011/0003* (2013.01); *B60R 2011/004* (2013.01); *B60R 2300/80* (2013.01)

(56) References Cited

U.S. PATENT DOCUMENTS

| | | | |
|---|---|---|---|
| 10,928,830 B1* | 2/2021 | Tran | G05D 1/0088 |
| 2013/0060642 A1* | 3/2013 | Shlomot | G06Q 30/0241 |
| | | | 705/14.66 |
| 2015/0220992 A1* | 8/2015 | Brown | G06Q 30/0261 |
| | | | 705/14.62 |
| 2018/0007414 A1* | 1/2018 | Li | H04N 21/251 |
| 2018/0047056 A1* | 2/2018 | Kim | G06Q 30/0266 |
| 2020/0143422 A1* | 5/2020 | Goto | G06V 40/10 |
| 2020/0159251 A1* | 5/2020 | Iwasaki | G08G 1/096805 |
| 2021/0103287 A1* | 4/2021 | Shapira | G01C 21/3407 |
| 2021/0110791 A1* | 4/2021 | Sadovitch | B60K 35/00 |
| 2021/0149397 A1* | 5/2021 | Shin | G06V 20/56 |
| 2021/0403022 A1* | 12/2021 | Hong | G06V 40/20 |
| 2022/0194400 A1* | 6/2022 | Gee | B60W 50/14 |

FOREIGN PATENT DOCUMENTS

| | | | |
|---|---|---|---|
| JP | 4916274 | B2 | 4/2012 |
| JP | 5015749 | B2 | 8/2012 |

* cited by examiner

FIG. 4

| IDENTIFICATION MARK | OCCUPANT ATTRIBUTE | CONTENT |
|---|---|---|
| S1 | NUMBER OF PERSONS: THREE<br>SEX: MALE, FEMALE, MALE<br>AGE: 40 YEARS OLD, 35 YEARS OLD, 0 YEARS OLD | INFORMATION ON FACILITY IN COMMERCIAL FACILITY: BABY PRODUCTS STORE<br>COUPON INFORMATION: DISCOUNT COUPONS FOR BABY PRODUCTS |
| S2 | FACE | PRODUCT DETAILS: LAST ORDERED PRODUCT |
| . . . | . . . | . . . |

FIG. 5

| IDENTIFICATION MARK | INFORMATION REGARDING OCCUPANT | FAVORABILITY RATING OF OCCUPANT | NECESSITY OF UPDATE | OCCUPANT ATTRIBUTE | CONTENT |
|---|---|---|---|---|---|
| S1 | EXPRESSION: SMILING FACE | 100 | UNNECESSARY | NUMBER OF PERSONS: THREE SEX: MALE, FEMALE, MALE AGE: 40 YEARS OLD, 35 YEARS OLD, 0 YEARS OLD | INFORMATION ON FACILITY IN COMMERCIAL FACILITY: BABY PRODUCTS STORE COUPON INFORMATION: DISCOUNT COUPONS FOR BABY PRODUCTS |
| S2 | GESTURES: HESITATING GESTURE | 10 | NECESSARY | FACE | PRODUCT DETAILS: PRODUCT MOST ORDERED IN PAST |
| ... | ... | ... | ... | ... | ... |

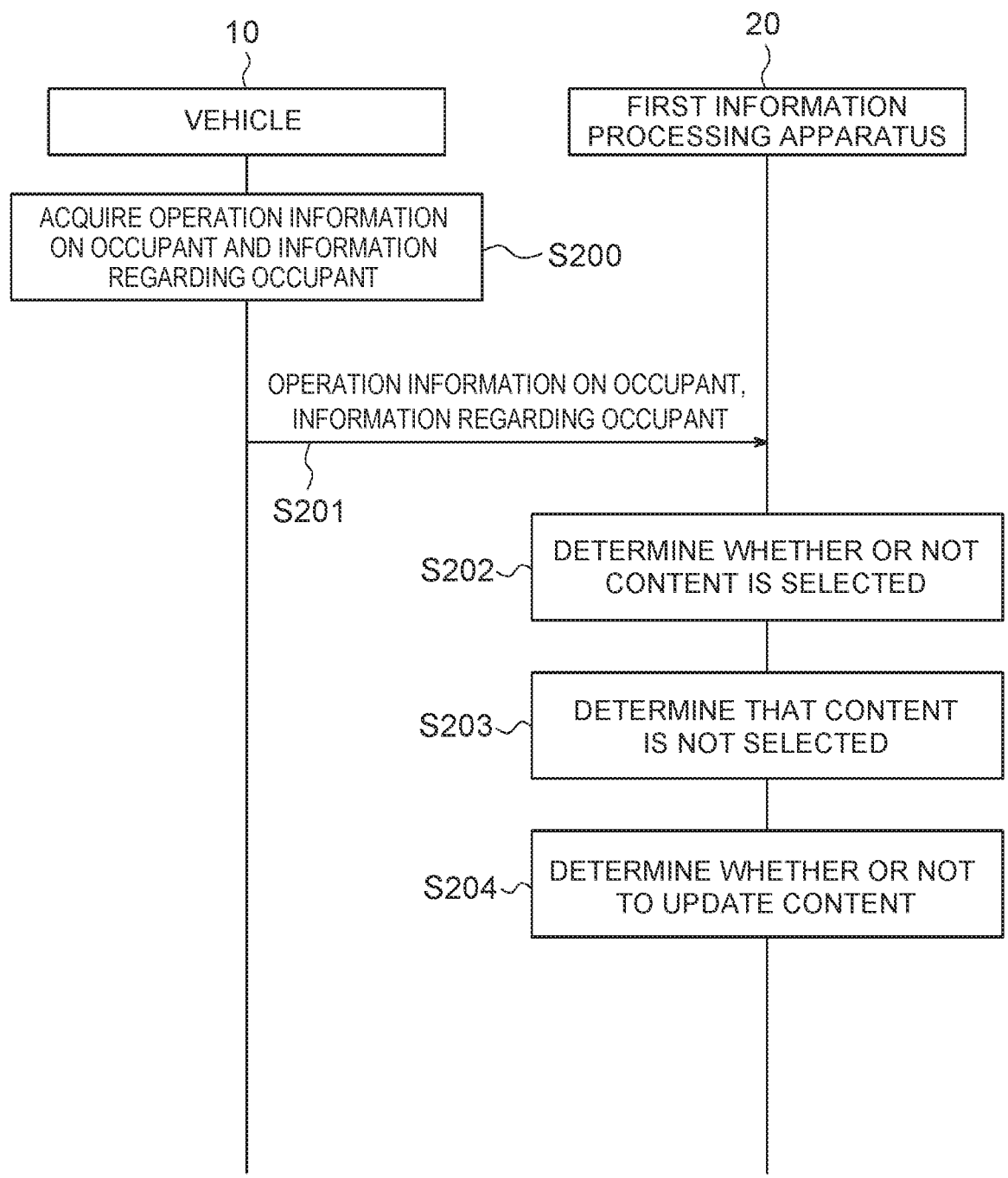

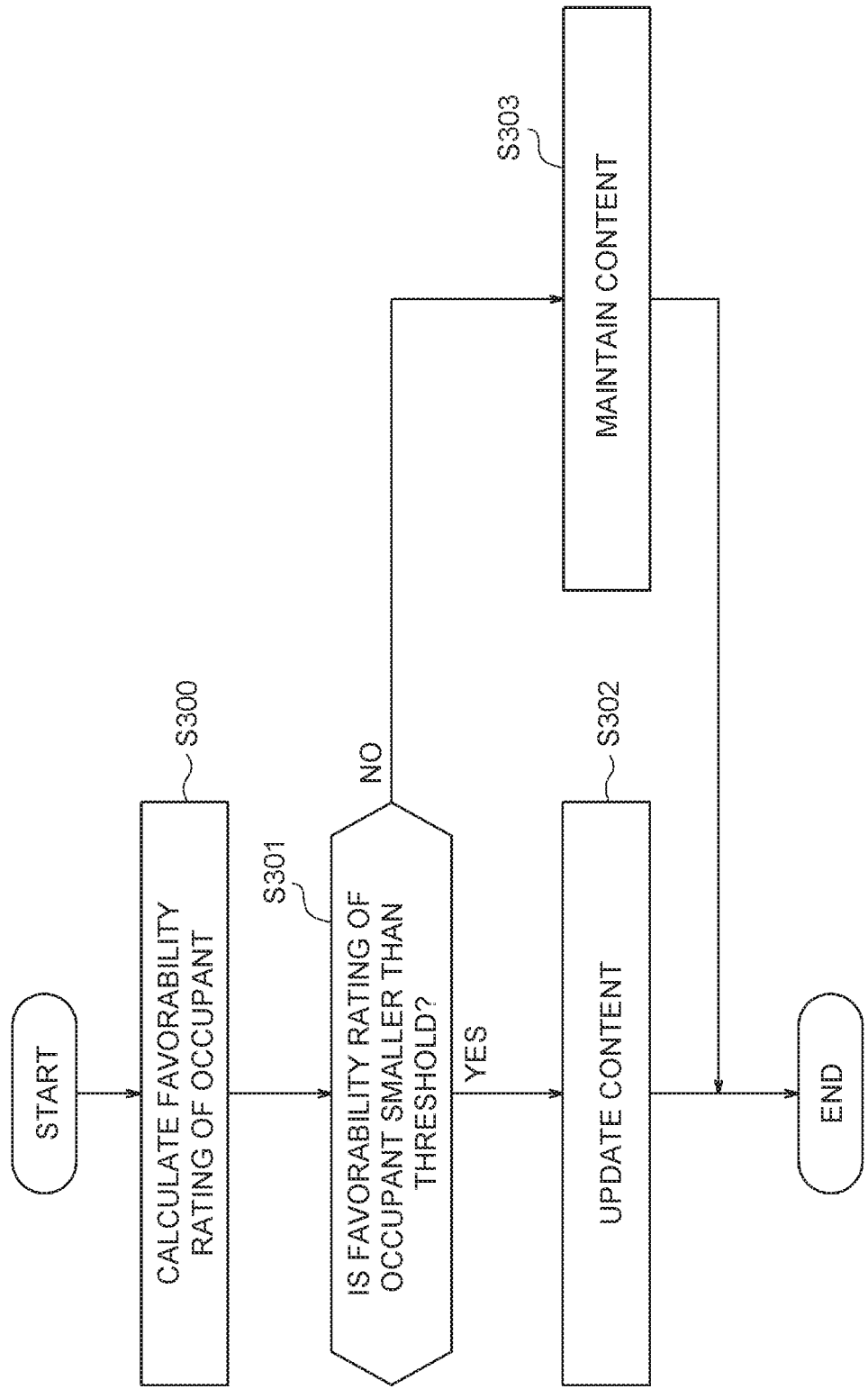

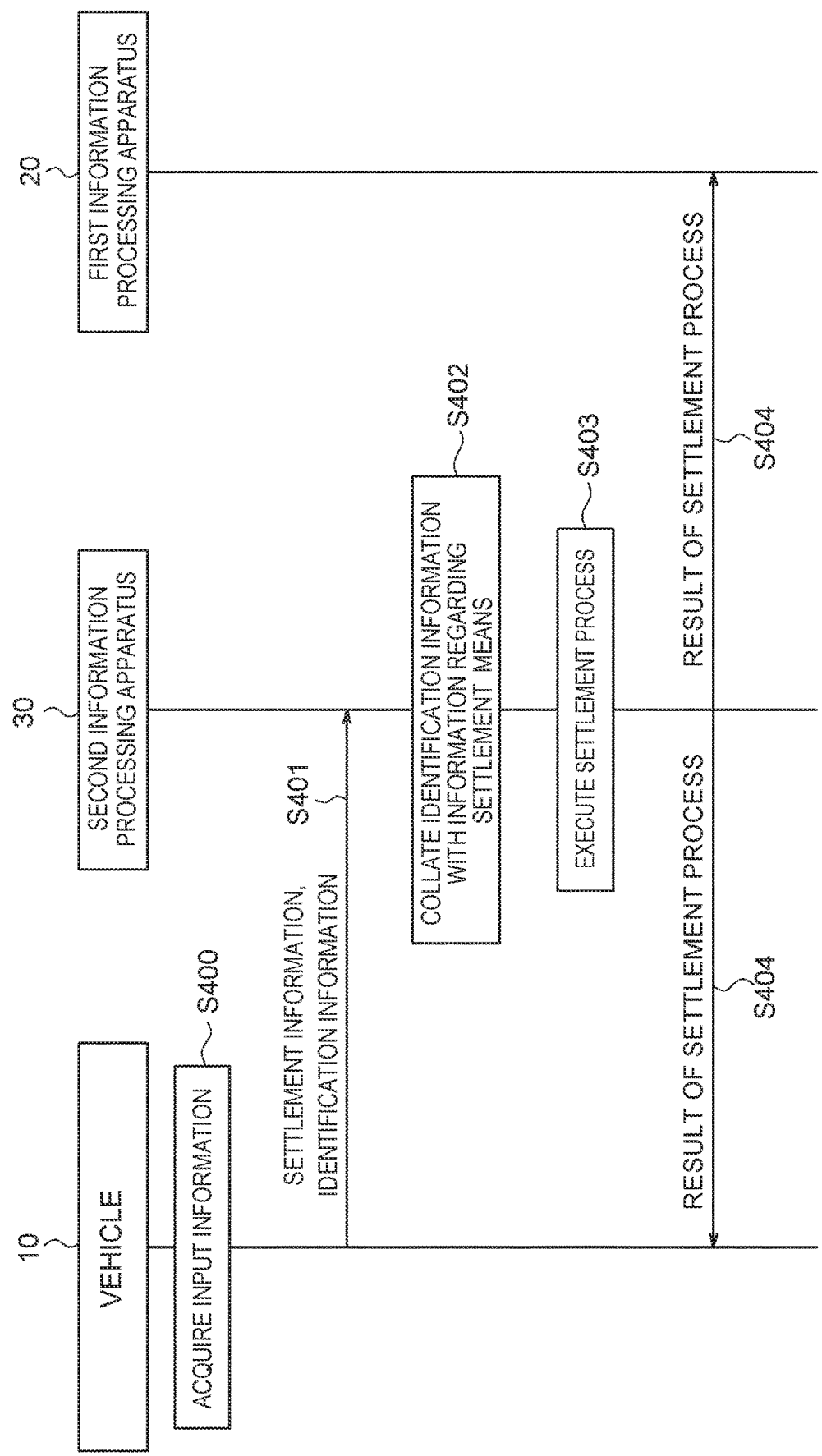

INFORMATION PROCESSING SYSTEM, PROGRAM, AND CONTROL METHOD

INCORPORATION BY REFERENCE

The disclosure of Japanese Patent Application No. 2019-032034 filed on Feb. 25, 2019 including the specification, drawings and abstract is incorporated herein by reference in its entirety.

BACKGROUND

1. Technical Field

The present disclosure relates to an information processing system, a program, and a control method.

2. Description of Related Art

A technique has conventionally been known in which a vehicle images an identification mark with an outside camera mounted on the vehicle and acquires content related with the identification mark. For example, Japanese Patent No. 5015749 discloses a vehicle location detector configured to image, with an in-vehicle camera, a bar code or a QR code (registered trademark) including location information, the bar code or QR code being drawn on the surface of a road in an indoor facility, and detect the location of the vehicle based on the location information included in the imaged bar code or QR code.

SUMMARY

There are requests from service providers to provide contents to vehicle occupants through effective usage of identification marks that are associated with the contents including the details of products or the like, instead of the usage of fixed identification marks that are associated with fixed contents such as location information. In these requests, the service providers desire to provide optimal contents to the vehicle occupants.

An object of the present disclosure made in view of these circumstances is to provide an information processing system, a program, and a control method, capable of contributing to the optimization of content provision to vehicle occupants through effective usage of identification marks.

The information processing system according to one aspect of the present disclosure relates to an information processing system, including a vehicle, and an information processing apparatus configured to acquire from the vehicle information acquired by the vehicle. The vehicle is configured to image, with an outside camera, an identification mark associated with a content provided by a service provider, output the content associated with the imaged identification mark to an occupant in a vehicle cabin of the vehicle, acquire operation information on the occupant relating to the output content, and acquire information regarding the occupant when the occupant performs operation relating to the content in the vehicle cabin. The information processing apparatus is configured to, when determining that the output content is not selected by the occupant based on the operation information on the occupant, determine whether or not to update the content that is not selected, based on the information regarding the occupant.

A program according to the embodiment of the present disclosure relates to a program operable in an information processing system, the system including a vehicle, and an information processing apparatus configured to acquire from the vehicle information acquired by the vehicle. The program causes the vehicle to execute the steps of: imaging, with an outside camera, an identification mark associated with a content provided by a service provider; outputting the content associated with the imaged identification mark to an occupant in a vehicle cabin of the vehicle; acquiring operation information on the occupant relating to the output content; acquiring information regarding the occupant when the occupant performs operation relating to the content in the vehicle cabin. The program causes the information processing apparatus to execute the step of, when determining that the output content is not selected by the occupant based on the operation information on the occupant, determining whether or not to update the content that is not selected, based on the information regarding the occupant.

A control method according to the embodiment of the present disclosure relates to a control method in an information processing system, the system including a vehicle, and an information processing apparatus configured to acquire from the vehicle information acquired by the vehicle, the method including the steps of: the vehicle imaging, with an outside camera, an identification mark associated with a content provided by a service provider; the vehicle outputting the content associated with the imaged identification mark to an occupant in a vehicle cabin of the vehicle; the vehicle acquiring operation information on the occupant relating to the output content; the vehicle acquiring information regarding the occupant when the occupant performs operation relating to the content in the vehicle cabin; and the information processing apparatus determining, when determining that the output content is not selected by the occupant based on the operation information on the occupant, whether or not to update the content that is not selected, based on the information regarding the occupant.

The information processing system, program, and control method according to the embodiment of the present disclosure can contribute to the optimization of content provision to vehicle occupants through effective usage of identification marks.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 shows a first example of the information processed by a control unit of the first information processing apparatus of FIG. 3;

FIG. 5 shows a second example of the information processed by the control unit of the first information processing apparatus of FIG. 3;

FIG. 8 is a sequence diagram showing a second example of the operation flow of the information processing system of FIG. 1;

FIG. 9 is a flowchart showing an example of the operation flow of the first information processing apparatus of FIG. 1; and FIG. 10 is a sequence diagram showing a third example of the operation flow of the information processing system of FIG. 1.

DETAILED DESCRIPTION OF EMBODIMENTS

Hereinbelow, one embodiment of the present disclosure will be described with reference to the accompanying drawings.

Figure 1:
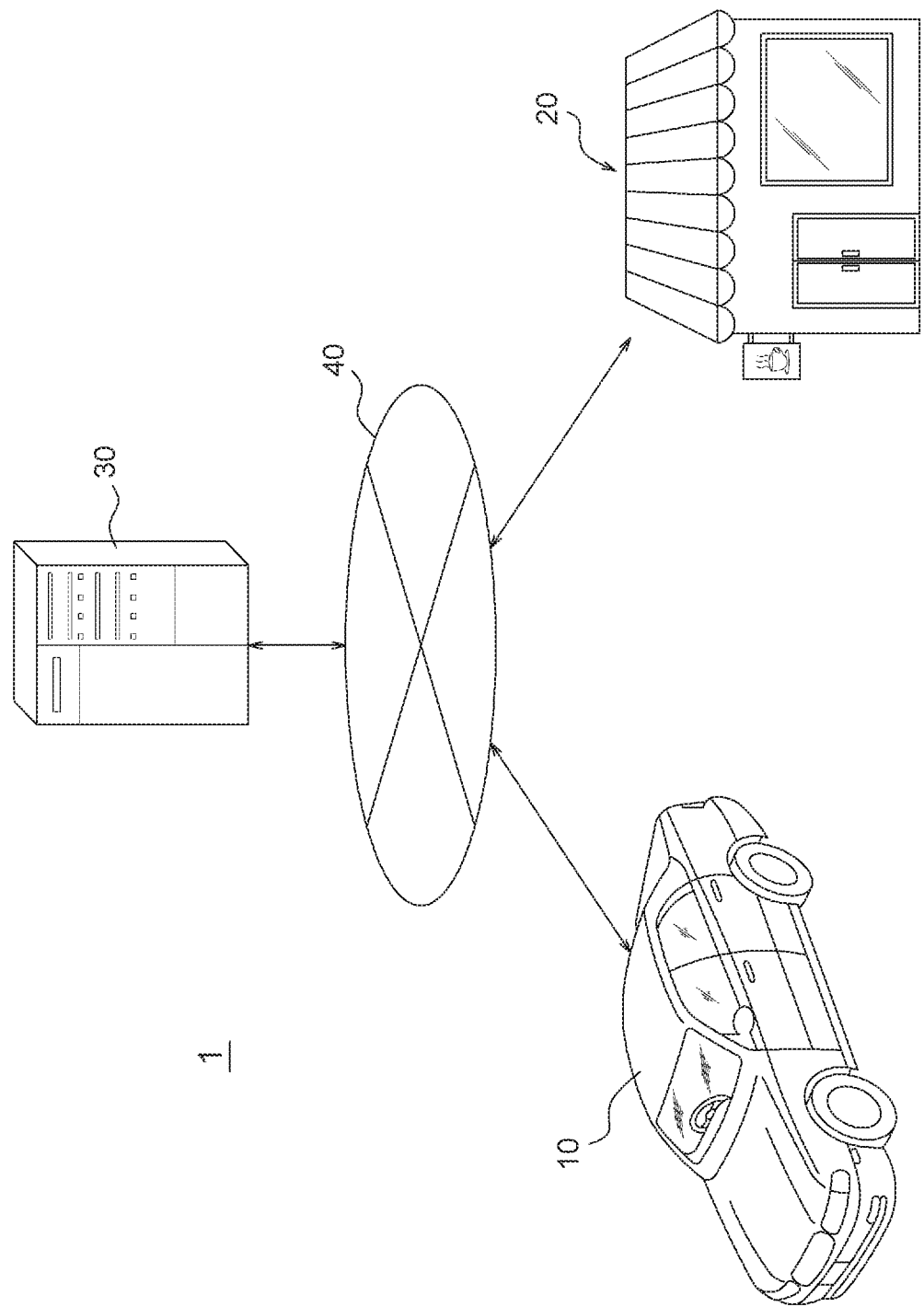
FIG. 1 shows a schematic configuration of an information processing system according to one embodiment of the present disclosure.

FIG. 1 shows a schematic configuration of an information processing system 1 according to the embodiment of the present disclosure. With reference to FIG. 1, description is mainly given of the configuration and function of the information processing system 1 according to the embodiment of the present disclosure.

The information processing system 1 includes a vehicle 10, a first information processing apparatus 20, and a second information processing apparatus 30. The vehicle 10, the first information processing apparatus 20, and the second information processing apparatus 30 are each communicably connected with a network 40 including, for example, a mobile communication network, and the Internet.

The vehicle 10 is, for example, an automobile. However, without being limited to the automobile, the vehicle 10 may be any vehicle in which a human can ride. The vehicle 10 is a vehicle driven by a driver. However, without being limited to this, the vehicle 10 may be, for example, driven autonomously. The autonomous driving includes, for example, autonomous driving of levels one to five defined by Society of Automotive Engineers (SAE). However, without being limited to these, the autonomous driving may optionally be defined. In FIG. 1, only one vehicle 10 is illustrated for convenience of description. However, the information processing system 1 may include one or more vehicles 10.

For example, the first information processing apparatus 20 is constituted of one or more server apparatuses capable of communicating with each other, the server apparatuses being possessed by a service provider that provides any services to the customers including an occupant of the vehicle 10. Without being limited to these, the first information processing apparatus 20 may be any general-purpose electronic apparatus, such as a personal computer (PC) or a smartphone, or may be another electronic apparatus dedicated for the information processing system 1. The service provider manages shops, commercial facilities, or the like, for example.

For example, the second information processing apparatus 30 is constituted of one or more server apparatuses capable of communicating with each other, the apparatuses being possessed by a company that provides settlement services, such as a credit card company. Without being limited to these, the second information processing apparatus 30 may be any general-purpose electronic apparatus, such as a PC or a smartphone, or may be another electronic apparatus dedicated for the information processing system 1. In FIG. 1, for convenience of description, only one server apparatus 1 that constitutes the second information processing apparatus 30 is exemplarily illustrated.

Figure 2:
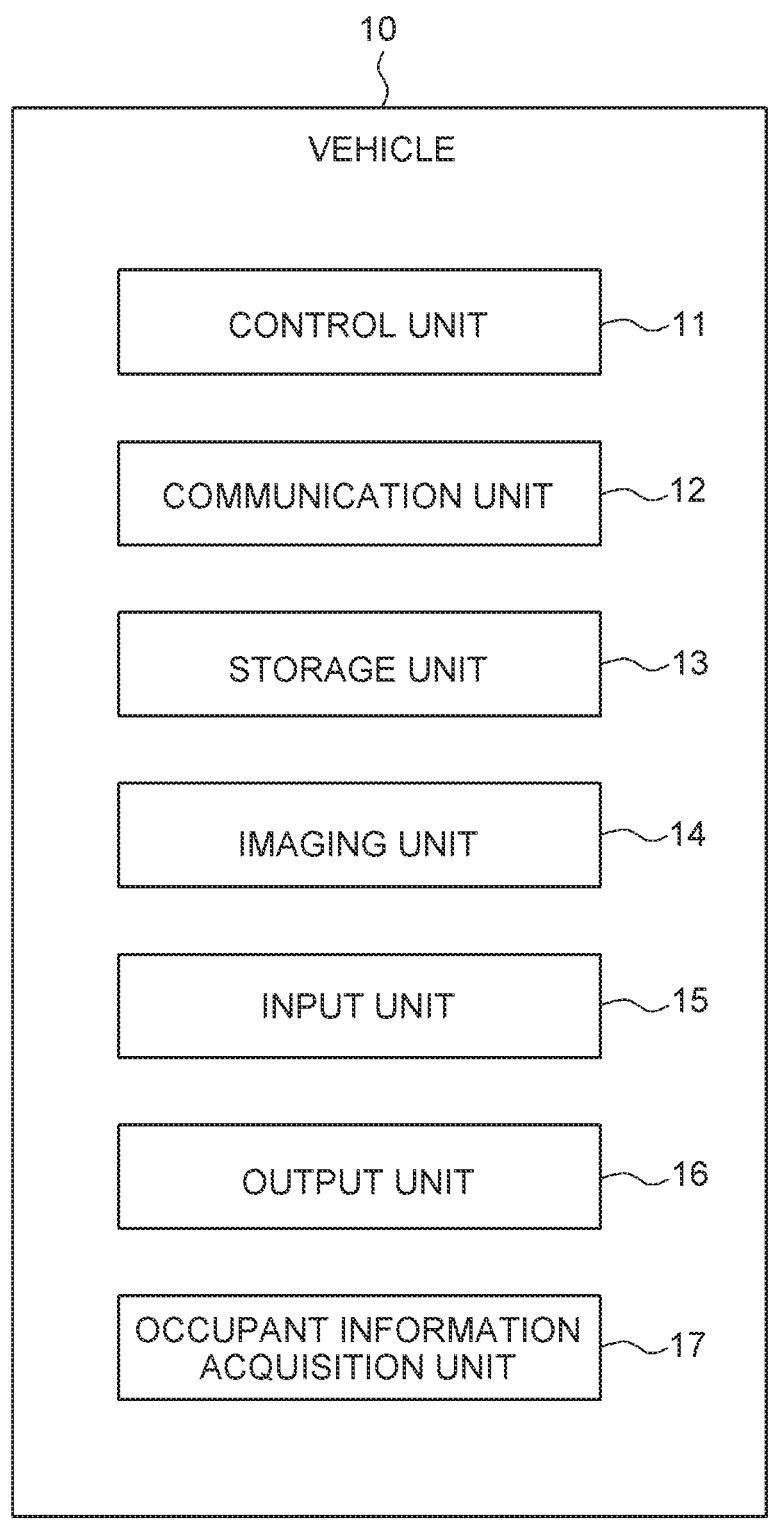
FIG. 2 is a block diagram showing a schematic configuration of a vehicle according to the embodiment of the present disclosure.

FIG. 2 is a block diagram showing a schematic configuration of the vehicle 10 according to the embodiment of the present disclosure.

The vehicle 10 includes a control unit 11, a communication unit 12, a storage unit 13, an imaging unit 14, an input unit 15, an output unit 16, and an occupant information acquisition unit 17. These component units that constitute the vehicle 10 are communicably connected with each other through, for example, an in-vehicle network such as a controller area network (CAN) or an exclusive line.

The embodiment is outlined such that the imaging unit 14 of the vehicle 10 images, with an outside camera, an identification mark associated with the content provided by the service provider. Examples of the content include the details of products supplied to customers by the service provider, settlement information associated with the products ordered by the customers, a congestion situation in shops or commercial facilities, facility information in the commercial facilities, a vacancy situation of parking lots of the shops or the commercial facilities, and coupon information usable in the shops or the commercial facilities. The control unit 11 may determine whether or not the imaging unit 14 images an identification mark. For example, when determining that the imaging unit 14 images an identification mark, the control unit 11 acquires the content associated with the imaged identification mark. The control unit 11 outputs the acquired content to an occupant or occupants in the vehicle cabin of the vehicle 10 through the output unit 16. The occupants of the vehicle 10 include a driver and a passenger or passengers of the vehicle 10. The number of the occupants of the vehicle 10 may be one or more.

The control unit 11 of the vehicle 10 acquires from the input unit 15 the operation information on an occupant relating to the content output by the output unit 16. The control unit 11 acquires through the occupant information acquisition unit 17 the information regarding the occupant when the occupant performs operation relating to the content in the vehicle cabin of the vehicle 10. The first information processing apparatus 20 acquires the operation information on the occupant and the information regarding the occupant from the vehicle 10. When determining, based on the operation information on the occupant, that the content output by the output unit 16 is not selected by the occupant, the first information processing apparatus 20 determines whether or not to update the content that is not selected, based on the information regarding the occupant.

Next, respective component members of the vehicle 10 will be described in detail.

The control unit 11 includes one or more processors. In the embodiment, the term "processor" refers to a general-purpose processor or an exclusive processor dedicated for specific processing. However, the "processor" is not limited to these. An electronic control unit (ECU) mounted on the vehicle 10 may function as the control unit 11. The control unit 11 is connected, for example, communicably with the respective component units that constitute the vehicle 10, such that the control unit 11 controls the operation of the entire vehicle 10. In the embodiment, the control unit 11 controls, for example, the imaging unit 14, the input unit 15, and the occupant information acquisition unit 17 to acquire various pieces of information.

The communication unit 12 includes a communication module which communicates through an in-vehicle network or an exclusive line. The communication unit 12 includes a communication module connected to the network 40. For example, the communication unit 12 may include a communication module in conformity with mobile object communication standards, such as 4th generation (4G) and 5th generation (5G) mobile object communication standards. For example, an in-vehicle communication device, such as a data communication module (DCM) may function as the communication unit 12. In the embodiment, the vehicle 10 is connected to the network 40 through the communication unit 12.

The storage unit 13 includes one or more memories. Although examples of the "memory" include a semiconductor memory, a magnetic memory, or an optical memory in the embodiment, the memory is not limited to these. The memory or memories included in the storage unit 13 may each function as a main storage, an auxiliary storage, or a cache memory, for example. The storage unit 13 stores any information that is used for operation of the vehicle 10. For example, the storage unit 13 may store system programs, application programs, and various pieces of information acquired by the vehicle 10. The information stored in the storage unit 13 may be updated with the information that is acquired from the network 40 through the communication unit 12, for example.

The imaging unit 14 includes an outside camera that images the outside of the vehicle 10. The imaging unit 14 images an identification mark that is associated with a content updated at any time on the service provider side and that changes in every content. The identification mark includes a QR code. Without being limited to the QR code, the identification mark may include any mark, such as a bar code. For example, the imaging unit 14 may image such an identification mark, while constantly imaging the outside of the vehicle 10, or may image such an identification mark based on the operation performed by the occupant of the vehicle 10 with use of the input unit 15.

The imaging unit 14 or the control unit 11 may recognize an identification mark from the image imaged by the outside camera using any image recognition technique.

The input unit 15 receives input operation performed by the occupant of the vehicle 10. In the embodiment, the input unit 15 includes, for example, an input interface included in a car navigation device. The input unit 15 receives input operation performed by the occupant of the vehicle 10. For example, the input unit 15 acquires operation information on the occupant of the vehicle 10 relating to the content output by the output unit 16. For example, when the content includes the details of products that are provided by the service provider to customers, the operation information on the occupant includes input information that is input when the occupant of the vehicle 10 selects a prescribed product from the product details output by the output unit 16. The input unit 15 outputs the acquired input information input by the occupant of the vehicle 10 to the control unit 11.

The output unit 16 outputs the information acquired by the imaging unit 14 to the occupant in the vehicle cabin of the vehicle 10. In the embodiment, the output unit 16 includes a car navigation device. For example, the output unit 16 includes an output device, such as an LCD monitor which constitutes the car navigation device. For example, the car navigation device which constitutes the output unit 16 outputs the content in the form of at least one of image data and audio data.

The output unit 16 is not limited to the car navigation device. The output unit 16 may include any output device which exerts an influence on at least one of a visual sense and an auditory sense of the occupant of the vehicle 10. The output unit 16 may include, for example, any voice output device other than the car navigation device, which mainly exerts an influence on the auditory sense of the occupant of the vehicle 10. The output unit 16 may also include any image output device other than the car navigation device, which mainly exerts an influence on the visual sense of the occupant of the vehicle 10, for example.

The occupant information acquisition unit 17 acquires information regarding an occupant in the vehicle cabin of the vehicle 10 and an occupant attribute. In the embodiment, the occupant information acquisition unit 17 includes an in-cabin camera that images the inside of the vehicle cabin of the vehicle 10. The occupant information acquisition unit 17 acquires the information regarding the occupant and the occupant attribute from an image imaged with the in-cabin camera, for example. At the time, the information regarding an occupant includes at least one of an expression, face orientation, a sight line, a blinking state, gesture, behavior, personal belongings, and driving (boarding) continuation time of the occupant of the vehicle 10. The occupant attribute includes at least one of age, sex, nationality, race, the number of occupants, and face. The occupant information acquisition unit 17 may constantly acquire the information regarding the occupant and the occupant attribute, or may acquire the information at proper timing.

The occupant information acquisition unit 17 may acquire the information, such as the face, the expression, the face orientation, the sight line, and the blinking state of the occupant from an image imaged with the in-cabin camera by using, for example, a facial recognition technology. In addition, the occupant information acquisition unit 17 may acquire the information regarding the occupant and the occupant attribute from an image imaged with the in-cabin camera by using any image recognition technology.

The configuration of the occupant information acquisition unit 17 is not limited to the above-described configuration. The occupant information acquisition unit 17 may include any other image sensors different from the in-cabin camera. The occupant information acquisition unit 17 may also include any other sensor that is connected to the CAN.

For example, the occupant information acquisition unit 17 may include any sound sensor that is disposed in the vehicle cabin of the vehicle 10 and that is connected to the CAN. The occupant information acquisition unit 17 may acquire the information regarding the occupant from output information output by any sound sensor, for example. At the time, the information regarding the occupant may include sound information attributed to the occupant, including, for example, the content of a conversation made by the occupant, voice generated by actions of the occupant that causes utterance of spoken languages other than the conversation, and sound generated by actions of the occupant that causes issuance of the sound other than the voice.

The occupant information acquisition unit 17 may acquire the information regarding the occupant from output information output by the sound sensor by using, for example, a speech recognition technology and any other recognition technologies.

For example, the occupant information acquisition unit 17 may include any biosensor that is disposed in the vehicle cabin of the vehicle 10 and that is connected to the CAN. The occupant information acquisition unit 17 may acquire the information regarding the occupant from output information output by the biosensor, for example. At the time, the information regarding the occupant may include biological states of the occupant, including brain waves, brain blood flow, blood pressure, blood sugar level, blood amino acids, heartbeat, pulse, body temperature, sensible temperature, hunger sensation, and fatigue.

Figure 3:
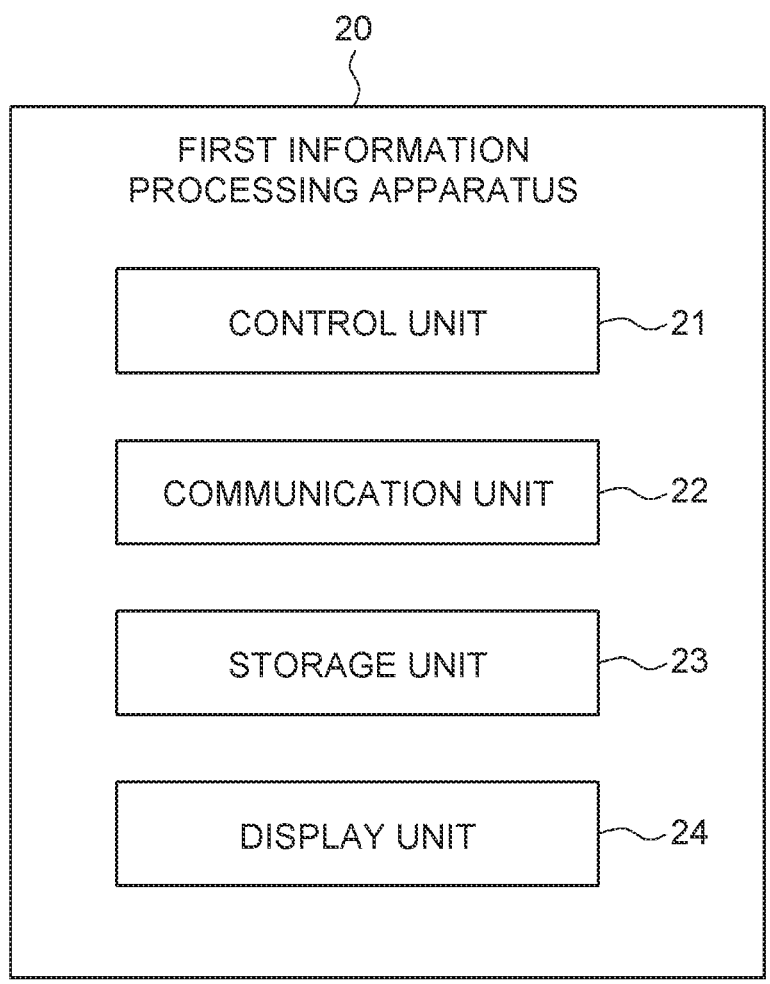
FIG. 3 is a block diagram showing a schematic configuration of a first information processing apparatus of FIG. 1.

FIG. 3 is a block diagram showing a schematic configuration of the first information processing apparatus 20 of FIG. 1. As shown in FIG. 3, the first information processing apparatus 20 includes a control unit 21, a communication unit 22, a storage unit 23, and a display unit 24.

The control unit 21 includes one or more processors. The control unit 21 is connected with the respective component units that constitute the first information processing apparatus 20 to control the operation of the entire first information processing apparatus 20. For example, the control unit 21 controls the communication unit 22 to acquire the information regarding an occupant and an occupant attribute from the occupant information acquisition unit 17 of the vehicle 10 through the network 40. For example, the control unit 21 controls the storage unit 23 to store in the storage unit 23 information necessary for operation of the first information processing apparatus 20.

The communication unit 22 includes a communication module connected to the network 40. For example, the communication unit 22 may include a communication module in conformity to a wired local area network (LAN) standard. In the embodiment, the first information processing apparatus 20 is connected to the network 40 through the communication unit 22.

The storage unit 23 includes one or more memories. The memory or memories included in the storage unit 23 may each function as a main storage, an auxiliary storage, or a cache memory, for example. The storage unit 23 stores any information that is used for operation of the first information processing apparatus 20. The information stored in the storage unit 23 may be updated with the information that is acquired from the network 40 through the communication unit 22, for example. For example, the storage unit 23 may store system programs and application programs.

For example, the storage unit 23 may store the information regarding the occupant and the occupant attribute acquired by the occupant information acquisition unit 17 of the vehicle 10. For example, the storage unit 23 may store the content that the service provider that owns the first information processing apparatus 20 desires to provide to customers, and information regarding an identification mark associated with the content corresponding to the attribute of the occupant of the vehicle 10. In addition, the storage unit 23 may store, for example, purchase data regarding services that are provided by the service provider and purchased by customers as big data of each customer. The control unit 21 may construct such purchase data by associating, for example, past purchase details of the customers with each of a plurality of occupant attributes acquired in the past by the occupant information acquisition unit 17 mounted on each of the vehicles 10.

The display unit 24 includes any display device that displays an identification mark imaged by the imaging unit 14 of the vehicle 10. For example, the display unit 24 includes an LCD monitor. The display unit 24 may be disposed, for example, in any spot in shops, commercial facilities, or the like, managed by the service provider. For example, the display unit 24 may be disposed in the vicinity of the entrance of a drive-through in a shop of the service provider that owns the first information processing apparatus 20, a spot facing a public road in the shop, or the like. For example, the display unit 24 may be disposed in the vicinity of the entrance of a parking lot, or the like, of a commercial facility of the service provider that owns the first information processing apparatus 20.

The control unit 21 may generate an identification mark in association with the content corresponding to the occupant attribute acquired by the occupant information acquisition unit 17 of the vehicle 10. Based on the occupant attribute acquired by the occupant information acquisition unit 17 of the vehicle 10, the control unit 21 may select a content corresponding to the occupant attribute, out of the contents stored in the storage unit 23, by machine learning, for example. The control unit 21 may have the configuration for any learning process in order to execute such a selection process. When selecting an optimal content by machine learning, the control unit 21 may refer to, for example, the customer's purchase data stored as big data in the storage unit 23. The control unit 21 displays an identification mark associated with the selected content on the display unit 24.

FIG. 4 shows a first example of the information processed by the control unit 21 of the first information processing apparatus 20 of FIG. 3. With reference to FIG. 4, the content selected by the control unit 21 of the first information processing apparatus 20 will be described in detail.

For example, as the occupant attributes acquired by the occupant information acquisition unit 17 of the vehicle 10, the control unit 21 acquires from the vehicle 10 the information that the number of the occupants of the vehicle 10 is three, the sex of the occupants is male, female, and male, respectively, and the age of the occupants is 40 years old, 35 years old, and 0 year old, respectively. In this case, in conformity to the occupant attributes, the control unit 21 selects, out of the contents stored in the storage unit 23, information regarding a baby products shop as the information on a facility in a commercial facility, and information regarding discount coupons of baby products as coupon information. The control unit 21 generates an identification mark S1 in association with such a content corresponding to the occupant attributes, and displays the generated content on the display unit 24.

For example, the control unit 21 acquires from the vehicle 10 the face of an occupant of the vehicle 10 as an occupant attribute acquired by the occupant information acquisition unit 17 of the vehicle 10. At the time, the control unit 21 also refers to the customer's purchase data stored in the storage unit 23 to acquire the number of visits, past purchase details, and the like, of the occupant of the vehicle 10 based on the occupant attribute. The control unit 21 selects, out of the contents stored in the storage unit 23, information regarding a last product purchased by the occupant of the vehicle 10, as the product details that the service provider provides to the customer in accordance with the customer attribute. The control unit 21 generates an identification mark S2 in association with such a content in accordance with the occupant attribute, and displays the generated content on the display unit 24.

The imaging unit 14 of the vehicle 10 images, with an outside camera, the identification mark that is associated with the content provided by the service provider. The output unit 16 of the vehicle 10 outputs to the occupant in the vehicle cabin of the vehicle 10 the content associated with the identification mark imaged by the imaging unit 14. The input unit 15 of the vehicle 10 acquires operation information on an occupant of the vehicle 10 relating to the content that is output by the output unit 16. Similarly, the occupant information acquisition unit 17 of the vehicle 10 acquires information regarding the occupant when the occupant performs operation relating to the content in the vehicle cabin of the vehicle 10. Then, the communication unit 12 of the vehicle 10 transmits the operation information on the occupant acquired by the input unit 15 and the information regarding the occupant acquired by the occupant information acquisition unit 17 to the first information processing apparatus 20 through the network 40.

The control unit 21 of the first information processing apparatus 20 determines, based on the operation information on the occupant acquired from the vehicle 10, whether or not the content output by the output unit 16 of the vehicle 10 is selected by the occupant of the vehicle 10. For example, when the occupant of the vehicle 10 performs operation to return a content screen displayed on the output unit 16 to a home screen, the control unit 21 determines that the output content is not selected by the occupant of the vehicle 10. Accordingly, the control unit 21 determines whether or not to update the content that is not selected, based on the information regarding the occupant acquired from the vehicle 10.

For example, the control unit 21 may calculate a favorability rating of the occupant toward the content that is not selected, by machine learning based on the information regarding the occupant acquired from the vehicle 10. The control unit 21 may have the configuration for any learning process in order to execute such a calculation process. The favorability rating of the occupant may be calculated based on any index. For example, the favorability rating of the occupant may be expressed by a numerical value from zero to 100. Thus, the favorability rating of the occupant may be expressed by a numerical value in the range of any numerical values. At the time, as the value of the favorability rating of the occupant is larger, it indicates that the occupant of the vehicle 10 has a more favorable impression on the content. On the contrary, as the value of the favorability rating of the occupant is smaller, it indicates that the occupant of the vehicle 10 has a less favorable impression on the content. The favorability rating of the occupant may be calculated for each occupant. When there are a plurality of occupants, the favorability rating may be calculated as an average of the favorability ratings of all the occupants.

When the favorability rating of the occupant is smaller than a threshold, the control unit 21 may update the content that is not selected, such that the content conforms to the occupant attribute. In this case, the control unit 21 may select, by machine learning as in the above case, a content that conforms to the occupant attribute, out of the contents stored in the storage unit 23, based on the occupant attribute acquired by the occupant information acquisition unit 17 of the vehicle 10.

For example, the control unit 21 may continuously display the identification mark associated with the updated content on the display unit 24 so as to display the content updated in real time to the same occupant of the vehicle 10. Without being limited to this configuration, the control unit 21 may store information regarding an identification mark associated with an updated content in the storage unit 23, and may provide the updated content at a future date to an occupant of the vehicle 10 who has identical or similar occupant attribute.

FIG. 5 shows a second example of the information processed by the control unit 21 of the first information processing apparatus 20 of FIG. 3. With reference to FIG. 5, the content which is to be updated or not is determined by the control unit 21 of the first information processing apparatus 20 will be described in detail.

For example, the control unit 21 acquires a smiling expression of an occupant as the information regarding the occupant acquired by the occupant information acquisition unit 17 of the vehicle 10. At the time, the control unit 21 obtains 100 as a calculated value of the favorability rating of the occupant, based on such expression of the occupant. For example, when the threshold of the favorability rating of the occupant is set to 50, the favorability rating of the occupant is larger than the threshold. Hence, the control unit 21 does not update the content associated with the identification mark S1. More specifically, although the content associated with the identification mark S1 is not selected by the occupant of the vehicle 10, the occupant of the vehicle 10 has a favorable impression on the content. Hence, the control unit 21 maintains the content associated with the identification mark S1.

For example, the control unit 21 acquires a hesitating gesture of an occupant as the information regarding the occupant acquired by the occupant information acquisition unit 17 of the vehicle 10. At the time, the control unit 21 obtains 10 as a calculated value of the favorability rating of the occupant, based on such gesture of the occupant. For example, when the threshold of the favorability rating of the occupant is set to 50, the favorability rating of the occupant is smaller than the threshold. Hence, the control unit 21 updates the content associated with the identification mark S2 such that the content conforms to the occupant attribute. For example, the control unit 21 updates the content associated with the identification mark S2 such that the information regarding the last product ordered by the occupant of the vehicle 10 is replaced with the information regarding the product most ordered in the past by the occupant of the vehicle 10. In this case, the control unit 21 also refers to the customer's purchase data stored in the storage unit 23 and acquires the number of visits, past purchase details, and the like, of the occupant of the vehicle 10 based on the occupant attribute.

Figure 6:
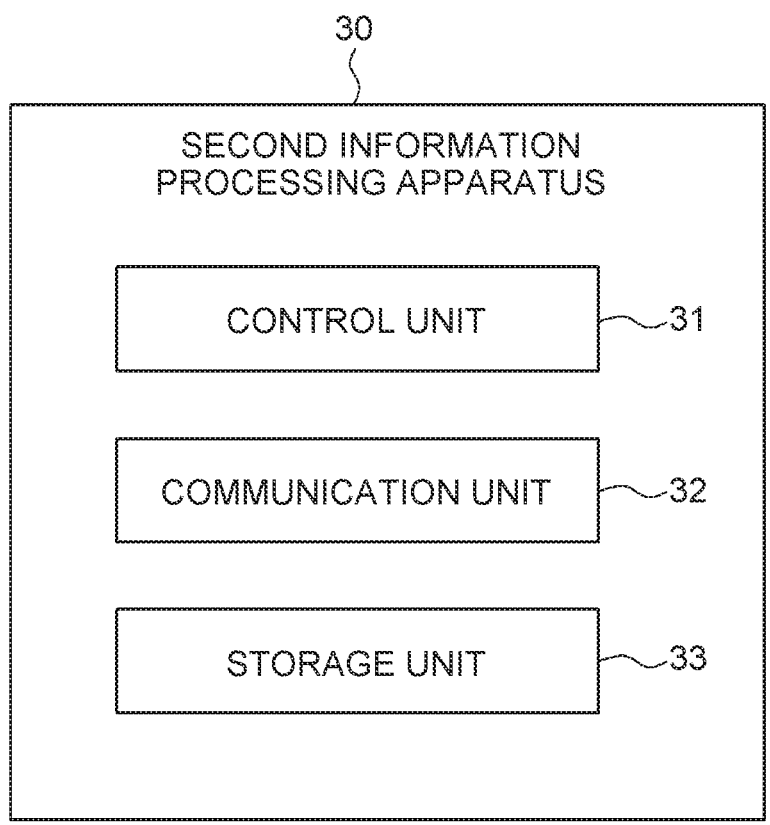
FIG. 6 is a block diagram showing a schematic configuration of a second information processing apparatus of FIG. 1.

FIG. 6 is a block diagram showing a schematic configuration of the second information processing apparatus 30 of FIG. 1. As shown in FIG. 6, the second information processing apparatus 30 includes a control unit 31, a communication unit 32, and a storage unit 33.

The control unit 31 includes one or more processors. The control unit 31 is connected with the respective component units that constitute the second information processing apparatus 30 so as to control the operation of the entire second information processing apparatus 30. For example, the control unit 31 controls the communication unit 32 to acquire later-described settlement information from the vehicle 10 through the network 40. For example, the control unit 31 controls the storage unit 33 to store in the storage unit 33 information necessary for operation of the second information processing apparatus 30.

The communication unit 32 includes a communication module connected to the network 40. For example, the communication unit 32 may include a communication module in conformity to a wired local area network (LAN) standard. In the embodiment, the second information processing apparatus 30 is connected to the network 40 through the communication unit 32.

The storage unit 33 includes one or more memories. The memory or memories included in the storage unit 33 may each function as a main storage, an auxiliary storage, or a cache memory, for example. The storage unit 33 stores any information that is used for operation of the information processing apparatus 30. The information stored in the storage unit 33 may be updated with the information that is acquired from the network 40 through the communication unit 32, for example. For example, the storage unit 33 may store system programs, application programs, and information regarding settlement means of the occupants of the vehicle 10 for each of the occupants.

For example, when a content includes the details of products provided by the service provider to customers, the control unit 11 of the vehicle 10 acquires from the input unit 15 input information input when an occupant of the vehicle 10 selects a prescribed product from the details of products output by the output unit 16. At the time, the control unit 11 transmits, with the communication unit 12, the settlement information associated with the selected product to the external second information processing apparatus 30 on which information regarding settlement means of the occupant of the vehicle 10 is registered. In addition, the control unit 11transmits, with the communication unit 12, identification information on the occupant of the vehicle 10 to the external second information processing apparatus 30.

The control unit 31 of the second information processing apparatus 30 collates the identification information on the occupant of the vehicle 10 acquired from the vehicle 10 with the information regarding the settlement means stored in the storage unit 33, and executes a settlement process with respect to the settlement information associated with the selected product. The control unit 31 transmits, for example, the result of the settlement process to the vehicle 10 and the first information processing apparatus 20 through the network 40. Thus, the settlement process through the second information processing apparatus 30 is completed.

Figure 7:
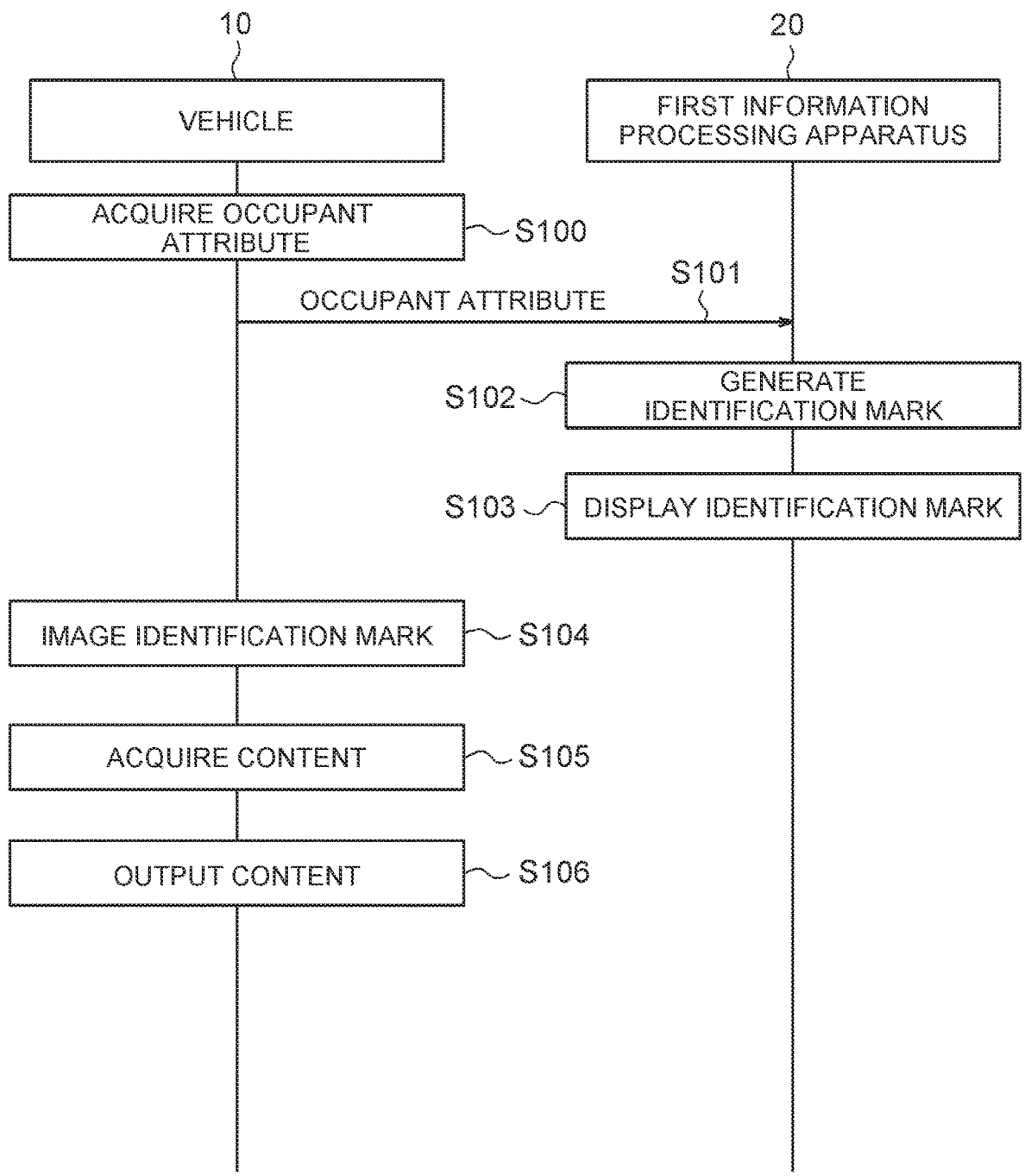
FIG. 7 is a sequence diagram showing a first example of an operation flow of the information processing system of FIG. 1.

FIG. 7 is a sequence diagram showing a first example of an operation flow of the information processing system 1 of FIG. 1. FIG. 7 shows an example of the flow executed between the vehicle 10 and the first information processing apparatus 20 until the content is provided to the occupant of the vehicle 10. With reference to FIG. 7, an example of the operation flow of the information processing system 1 will be described.

Step S100: the control unit 11 of the vehicle 10 uses the occupant information acquisition unit 17 to acquire an occupant attribute in the vehicle cabin of the vehicle 10.

Step S101: the control unit 11 of the vehicle 10 uses the communication unit 12 to transmit the occupant attribute acquired in step S100 to the first information processing apparatus 20.

Step S102: based on the occupant attribute acquired from the vehicle 10 in step S101, the control unit 21 of the first information processing apparatus 20 generates an identification mark in association with a content corresponding to the occupant attribute. In this case, the control unit 21 may refer to the customer's purchase data stored in the storage unit 23 as big data where necessary.

Step S103: the control unit 21 of the first information processing apparatus 20 displays the identification mark generated in step S102 on the display unit 24.

Step S104: the control unit 11 of the vehicle 10 uses the imaging unit 14 to image the identification mark that is displayed on the display unit 24 of the first information processing apparatus 20 in step S103.

Step S105: the control unit 11 of the vehicle 10 acquires the content associated with the identification mark imaged by the imaging unit 14 in step S104.

Step S106: the control unit 11 of the vehicle 10 uses the output unit 16 to output the content acquired in step S105 to the occupant in the vehicle cabin of the vehicle 10.

FIG. 8 is a sequence diagram showing a second example of the operation flow of the information processing system 1 of FIG. 1. FIG. 8 shows an example of the flow executed between the vehicle 10 and the first information processing apparatus 20 after the content is provided to the occupant of the vehicle 10. With reference to FIG. 8, an example of the operation flow of the information processing system 1 will be described.

Step S200: the control unit 11 of the vehicle 10 acquires from the input unit 15 the operation information on an occupant of the vehicle 10 relating to the content output by the output unit 16. Similarly, the control unit 11 of the vehicle 10 uses the occupant information acquisition unit 17 to acquire the information regarding the occupant when the occupant performs operation relating to the content in the vehicle cabin of the vehicle 10.

Step S201: the control unit 11 of the vehicle 10 uses the communication unit 12 to transmit the operation information on the occupant and information regarding the occupant acquired in step S200 to the first information processing apparatus 20.

Step S202: the control unit 21 of the first information processing apparatus 20 determines, based on the operation information on the occupant acquired from the vehicle 10 in step S201, whether or not the content output by the output unit 16 is selected by the occupant of the vehicle 10.

Step S203: the control unit 21 of the first information processing apparatus 20 determines that the content output by the output unit 16 is not selected by the occupant of the vehicle 10.

Step S204: the control unit 21 of the first information processing apparatus 20 determines whether or not to update the content that is not selected, based on the information regarding the occupant acquired from the vehicle 10 in step S201.

FIG. 9 is a flowchart showing an example of the operation flow of the first information processing apparatus 20 of FIG. 1. The flow shown in FIG. 9 embodies step S204 of FIG. 8. With reference to FIG. 9, an example of the operation flow of the first information processing apparatus 20 will be described.

Step S300: the control unit 21 of the first information processing apparatus 20 calculates the favorability rating of the occupant toward the content that is not selected, based on the information regarding the occupant acquired from the vehicle 10.

Step S301: the control unit 21 of the first information processing apparatus 20 determines whether or not the calculated favorability rating of the occupant is smaller than a threshold. When determining that the calculated favorability rating of the occupant is smaller than the threshold, the control unit 21 executes the process of step S302. When determining that the calculated favorability rating of the occupant is equal to or more than the threshold, the control unit 21 executes the process of step S303.

Step S302: when determining that the calculated favorability rating of the occupant is smaller than the threshold, the control unit 21 of the first information processing apparatus 20 updates the content that is not selected by the occupant of the vehicle 10 such that the content conforms to the occupant attribute.

Step S303: when determining that the calculated favorability rating of the occupant is equal to or more than the threshold, the control unit 21 of the first information processing apparatus 20 maintains the content that is not selected by the occupant of the vehicle 10.

FIG. 10 is a sequence diagram showing a third example of an operation flow of the information processing system 1 of FIG. 1. FIG. 10 shows an example of the flow mainly executed between the vehicle 10 and the second information processing apparatus 30. More specifically, FIG. 10 shows an example of the flow after the occupant of the vehicle 10 performs selecting operation with respect to the provided content until the settlement process is completed. With reference to FIG. 10, an example of the operation flow of the information processing system 1 will be described.

Step S400: the control unit 11 of the vehicle 10 acquires from the input unit 15 input information input when, for example, an occupant of the vehicle 10 selects a prescribed product from the details of products output by the output unit 16.

Step S401: the control unit 11 of the vehicle 10 uses the communication unit 12 to transmit the settlement information associated with the product selected in step S400 to the second information processing apparatus 30. In addition, the control unit 11 uses the communication unit 12 to transmit the identification information on the occupant of the vehicle 10 to the second information processing apparatus 30.

Step S402: the control unit 31 of the second information processing apparatus 30 collates the identification information on the occupant of the vehicle 10 acquired from the vehicle 10 in step S401 with the information regarding the settlement means stored in the storage unit 33.

Step S403: the control unit 31 of the second information processing apparatus 30 executes the settlement process with respect to the settlement information acquired from the vehicle 10 in step S401.

Step S404: the control unit 31 of the second information processing apparatus 30 transmits the result of the settlement process performed in step S403 to the vehicle 10 and the first information processing apparatus 20 through the network 40.

As described in the foregoing, the vehicle 10 according to the embodiment can contribute to content provision to the occupant of the vehicle 10 through effective usage of the identification mark. More specifically, the identification mark imaged by the imaging unit 14 is associated with the content updated on the service provider side at all times. Since the identification mark changes with the content, it is possible to appropriately provide to the occupant of the vehicle 10 the content that the service provider desires to provide on a moment-to-moment basis. For example, when the content includes the product details provided to customers by the service provider, the service provider can appropriately provide to the occupant of the vehicle 10 the latest product details that are updated in accordance with replace, change, or the like, of the products. Thus, the occupant of the vehicle 10 can check various contents described above in the latest state.

For example, the display unit 24 of the first information processing apparatus 20 constantly displays the identification mark, associated with the content that the service provider desires to provide for a prescribed period, during the corresponding period. This makes it possible to eliminate the necessity of the first information processing apparatus 20 to execute the process of individually identifying the respective vehicles 10. If the identification mark is not displayed on the display unit 24, the service provider is unable to provide the content to the occupant of the vehicle 10 unless the first information processing apparatus 20 detects arrival of the vehicle 10 at a corresponding shop, commercial facility, or the like by some kind of method. The information processing system 1 according to the embodiment constantly displays the identification mark on the display unit 24, and the vehicle 10 automatically acquires the corresponding content upon arrival at the shop, commercial facility, or the like. This eliminates the necessity of the process regarding individual identification of the vehicles 10 by the first information processing apparatus 20.

In addition, the occupant of the vehicle 10 can easily check various contents while staying in the vehicle cabin, without leaving the vehicle 10. For example, when the vehicle 10 acquires a content based on the identification mark displayed at a spot facing a public road in a shop, the occupant of the vehicle 10 can easily obtain the content relating to the shop only by passing in front of the shop, without the labor of visiting the shop. For example, in the case where the vehicle 10 acquires the content based on the identification mark displayed in the vicinity of the entrance of a drive-through of a shop, the occupant of the vehicle 10 can easily check the content with the output unit 16 without the necessity of looking at a signboard disposed in the drive-through from a distance.

For example, when the content includes settlement information associated with a product ordered by customers, the occupant of the vehicle 10 can check the settlement information output by the output unit 16 in the vehicle cabin of the vehicle 10, and can complete the settlement process in the vehicle cabin of the vehicle 10 while operating the input unit 15. At the time, the settlement process may be executed based on, for example, the same operation flow as described with reference to FIG. 10. As described in the foregoing, when the occupant of the vehicle 10 completes the settlement process, the occupant may just operate the input unit 15 in the vehicle cabin of the vehicle 10. This may save the effort of, for example, taking out a wallet in the drive-through or the like, and paying money to an employee who stands on the counter of the shop. Therefore, the flow of order and settlement in the drive-through or the like can be smoothed.

The information processing system 1 according to the embodiment can contribute to the optimization of content provision to the occupant of the vehicle 10 through effective usage of an identification mark. More specifically, the control unit 21 of the first information processing apparatus 20 determines whether or not to update the content that is not selected, based on the information regarding the occupant. Accordingly, the content to be provided can appropriately be changed in response to the reaction of the occupant of the vehicle 10 when the occupant performs operation relating to the content. More specifically, when the reaction of the occupant toward the content is not favorable, the control unit 21 can update the content that is not selected and provide another content to the occupant of the vehicle 10. On the contrary, when the reaction of the occupant to the content is favorable, there is no reason for actively changing the content even though the occupant of the vehicle 10 does not select the content. Hence, the control unit 21 can maintain the content so as to appropriately cope with such situations.

The control unit 21 calculates the favorability rating of the occupant toward the content that is not selected, based on the information regarding the occupant. Accordingly, the information processing system 1 can execute determination regarding whether to update the content that is not selected, based on more objective information. Thus, the information processing system 1 can execute determination regarding update of the content with higher accuracy. In addition, the information processing system 1 updates the content that is not selected such that the content conforms to the occupant attribute. As a result, the information processing system 1 can provide to the occupant of the vehicle 10 an optimal content corresponding to the occupant attribute. Even if the service provider is not able to recognize why the provided content is not selected, the service provider can provide an appropriate content for the occupant of the vehicle 10 based on machine learning by the information processing system 1.

The vehicle 10 acquires information regarding the occupant and the occupant attribute from an image imaged with the in-cabin camera. As a result, the vehicle 10 can acquire information regarding the occupant and the occupant attribute as visual information. Thus, the first information processing apparatus 20 can correctly calculate the favorability rating of the occupant based on the visual information. The first information processing apparatus 20 can correctly select the content that conforms to the occupant attribute based on the visual information.

The vehicle 10 acquires information regarding the occupant of the vehicle 10 from output information output by any sensor that can acquire information regarding the occupant. That enables the vehicle 10 to acquire various pieces of information regarding the occupant that is unacquirable from the visual information. For example, the vehicle 10 can acquire sound information attributed to the occupant, which is unacquirable from the visual information, from output information output from a sound sensor. For example, the vehicle 10 can acquire a delicate change in emotion of the occupant, which is unacquirable from the visual information, from output information output by a biosensor as an occupant's biological state.

The vehicle 10 transmits settlement information to the second information processing apparatus 30 based on input information input when the occupant selects a product. Accordingly, the occupant of the vehicle 10 can also complete the settlement process in the vehicle cabin of the vehicle 10 while operating the input unit 15. Thus, the flow of order and settlement is smoothed, and the convenience of the occupant of the vehicle 10 is enhanced.

While the present disclosure has been described based on the drawings and embodiment, it is to be understood that those skilled in the art can easily make various transformations and corrections based on the present disclosure. Therefore, it is to be noted that these transformations and corrections are intended to be embraced in the range of the present disclosure. For example, the functions, or the like, included in each means, step, or the like, can be rearranged without causing logical inconsistency, and a plurality of means, steps, or the like, can be integrated into unity or can be divided.

For example, in the embodiment disclosed, the respective component units of the vehicle 10 are mounted on the vehicle 10. However, some or all of the processing operations executed by the respective component units of the vehicle 10 may be executed by any electronic apparatus, such as a smartphone or a computer.

For example, a general-purpose electronic apparatus, such as a smartphone and a computer, may be configured to function as at least one of the respective component units of the vehicle 10, the first information processing apparatus 20, and the second information processing apparatus 30 according to the embodiment disclosed. For example, a program describing the content of processes that implement the functions of the communication unit 12, or the like, according to the embodiment is stored in a memory of the electronic apparatus, and the program is read and executed by a processor of the electronic apparatus. Therefore, the disclosure according to the embodiment may be implemented as a program executable by the processor.

In the embodiment disclosed, the vehicle 10 and the first information processing apparatus 20 are communicably connected through the network 40. However, the vehicle 10 and the first information processing apparatus 20 may communicably be connected directly with use of any communication mode, without through the network 40.

In the embodiment disclosed, the favorability rating of the occupant is expressed by a numerical value in any numerical value ranges. However, without being limited to this, the favorability rating of the occupant may be expressed, for example, by any one of "low", "middle", and "high" levels.

In the embodiment disclosed, the control unit 21 determines whether or not to update the content that is not selected, based on the favorability rating of the occupant. However, without being limited to this, the control unit 21 may update the content that is not selected when prescribed information regarding the occupant is obtained, without calculating the favorability rating of the occupant. The prescribed information regarding the occupant may include, for example, prescribed gestures such as tilting one's head for the content that is not selected, prescribed conversation contents, such as a phrase "It's not the product I want" uttered by the occupant, and prescribed biological states, such as specific brain-wave patterns.

In the embodiment disclosed, the information processing system 1 is configured to calculate the favorability rating of the occupant based on information regarding the occupant. However, the information calculated based on the information regarding the occupant is not limited to the favorability rating of the occupant toward the content that is not selected. The information calculated based on the information regarding the occupant may be any index that is associated with the reaction of the occupant, including how favorable, how impressed, or how excited the occupant is toward the content that is not selected.

What is claimed is:

1. An information processing system, comprising:
    a vehicle; and
    an information processing apparatus configured to acquire from the vehicle information acquired by the vehicle, wherein:
    the vehicle is configured to
        image, with an outside camera, an identification mark associated with a content provided by a service provider,
        output the content associated with the imaged identification mark to an occupant in a vehicle cabin of the vehicle as output content,
        acquire operation information on the occupant relating to the output content,
        acquire information regarding the occupant when the occupant performs operation relating to the content in the vehicle cabin, and
        acquire an occupant attribute in the vehicle cabin of the vehicle; and
    the information processing apparatus is configured to
        when determining that the output content is not selected by the occupant based on the operation information on the occupant, determine whether or not to update the content that is not selected, based on the information regarding the occupant,
        calculate a favorability rating of the occupant toward the content that is not selected, based on the information regarding the occupant, and
        when the favorability rating of the occupant is smaller than a threshold, update the content that is not selected such that the content conforms to the occupant attribute.

2. The information processing system according to claim 1, wherein the vehicle includes an in-cabin camera that images an inside of the vehicle cabin of the vehicle, the vehicle being configured to acquire the information regarding the occupant and the occupant attribute from the image imaged with the in-cabin camera.

3. The information processing system according to claim 1, wherein:
the content includes details of products provided by the service provider to a customer; and
the operation information on the occupant includes input information input when the occupant selects a prescribed product from the details of the products.

4. The information processing system according to claim 1, wherein the identification mark includes a QR code.

5. A program operable in an information processing system, the system including a vehicle and an information processing apparatus configured to acquire from the vehicle information acquired by the vehicle, the program causing:
the vehicle to execute the steps of
imaging, with an outside camera, an identification mark associated with a content provided by a service provider,
outputting the content associated with the imaged identification mark to an occupant in a vehicle cabin of the vehicle as output content,
acquiring operation information on the occupant relating to the output content,
acquiring information regarding the occupant when the occupant performs operation relating to the content in the vehicle cabin, and
acquiring an occupant attribute in the vehicle cabin of the vehicle; and
the information processing apparatus to execute the steps of
when determining that the output content is not selected by the occupant based on the operation information on the occupant, determining whether or not to update the content that is not selected, based on the information regarding the occupant,
calculating a favorability rating of the occupant toward the content that is not selected, based on the information regarding the occupant, and
when the favorability rating of the occupant is smaller than a threshold, updating the content that is not selected such that the content conforms to the occupant attribute.

6. A control method in an information processing system, the system including a vehicle, and an information processing apparatus configured to acquire from the vehicle information acquired by the vehicle, the method comprising the steps of:
the vehicle imaging, with an outside camera, an identification mark associated with a content provided by a service provider;
the vehicle outputting the content associated with the identification mark to an occupant in a vehicle cabin of the vehicle as output content;
the vehicle acquiring operation information on the occupant relating to the output content;
the vehicle acquiring information regarding the occupant when the occupant performs operation relating to the content in the vehicle cabin;
the vehicle acquiring an occupant attribute in the vehicle cabin of the vehicle;
the information processing apparatus determining, when determining that the output content is not selected by the occupant based on the operation information on the occupant, whether or not to update the content that is not selected, based on the information regarding the occupant;
the information processing apparatus calculating a favorability rating of the occupant toward the content that is not selected, based on the information regarding the occupant; and
the information processing apparatus updating, when the favorability rating of the occupant is smaller than a threshold, the content that is not selected such that the content conforms to the occupant attribute.

* * * * *